US010085590B2

(12) United States Patent
Zwart et al.

(10) Patent No.: US 10,085,590 B2
(45) Date of Patent: Oct. 2, 2018

(54) APPARATUS FOR PREPARING HOT BEVERAGES WITH AUTO-POWER-DOWN MECHANISM (71) Applicant: KONINKLIJKE PHILIPS N.V., Eindhoven (NL)

(72) Inventors: Bart-Jan Zwart, Eindhoven (NL); Klaas Kooijker, Eindhoven (NL); Theodoor Stolk, Eindhoven (NL); Joldert Maria Boersma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 377 days.

(21) Appl. No.: 14/775,784

(22) PCT Filed: Mar. 14, 2014

(86) PCT No.: PCT/IB2014/059800
§ 371 (c)(1),
(2) Date: Sep. 14, 2015

(87) PCT Pub. No.: WO2014/147536
PCT Pub. Date: Sep. 25, 2014

(65) Prior Publication Data
US 2016/0029835 A1 Feb. 4, 2016

Related U.S. Application Data (60) Provisional application No. 61/803,570, filed on Mar. 20, 2013.

(51) Int. Cl.
*A47J 31/56* (2006.01)
*A47J 31/10* (2006.01)

(52) U.S. Cl.
CPC .............. *A47J 31/56* (2013.01); *A47J 31/10* (2013.01)

(58) Field of Classification Search
CPC .................................. A47J 31/10; A47J 31/56
USPC .......... 99/279, 281, 282, 290; 219/399, 439, 219/441, 501
See application file for complete search history.

(56) References Cited

U.S. PATENT DOCUMENTS

| 3,394,885 A * | 7/1968 | Arnot ................... A47J 27/2116 219/437 |
| 5,001,969 A | 3/1991 | Moore |
| 5,782,163 A * | 7/1998 | Chang ................. A47J 31/4439 99/281 |
| 2002/0083840 A1* | 7/2002 | Lassota ................... A47J 31/50 99/275 |

(Continued)

FOREIGN PATENT DOCUMENTS

| DE | 102008030541 A1 | 12/2009 |
| EP | 0079235 A2 | 5/1983 |

(Continued)

*Primary Examiner* — Thien S Tran (57) ABSTRACT

An apparatus for preparing hot beverages includes a heater and a latent heat storage provision (LHSP) that is in thermal contact with the heater. The LHSP contains, or is configured to contain, a phase-change material. The apparatus further includes an electric circuit for powering the heater. The electric circuit includes a switch assembly that is configured cut power to the heater when a temperature of the LHSP fulfills a predetermined auto-power-down condition.

22 Claims, 4 Drawing Sheets (56) References Cited

U.S. PATENT DOCUMENTS

2007/0295825 A1* 12/2007 McNaughton .......... B60S 1/487
                                                               237/12.3 B
2010/0282090 A1* 11/2010 Etter .................. A47J 31/542
                                                               99/288
2011/0259201 A1   10/2011 Mograbi
2012/0211483 A1    8/2012 Li
2013/0019756 A1    1/2013 Coats
2013/0200063 A1*  8/2013 Cooke ................ A47J 41/0044
                                                               219/439

FOREIGN PATENT DOCUMENTS

| EP | 1591050 A1 | | 11/2005 | | |
|----|-----------|---|---------|---|---|
| GB | 1503164 A | * | 3/1978 | ............... | F03G 7/06 |
| JP | 55086634 U1 | | 12/1978 | | |
| JP | 59125085 U1 | | 8/1983 | | |
| WO | WO 2011131595 A2 | * | 10/2011 | .......... | A47J 41/0044 |

* cited by examiner

APPARATUS FOR PREPARING HOT BEVERAGES WITH AUTO-POWER-DOWN MECHANISM

This application is the U.S. National Phase application under 35 U.S.C. § 371 of International Application No. PCT/IB2014/059800, filed on Mar. 14, 2014, which claims the benefit of U.S. Provisional Application 61/803,570 filed Mar. 20, 2013. These applications are hereby incorporated by reference herein.

FIELD OF THE INVENTION

The present invention relates to an apparatus for preparing hot beverages, such as a coffee machine, and in particular to such an apparatus including an auto-power-down or auto-shut-off mechanism.

BACKGROUND

Around the world, millions of machines for preparing hot beverages, such as coffee machines, are sold every year. Currently, the energy efficiency of these machines leaves to be desired, while enhancements may be achieved with relatively simple measures such as an auto-power-down mechanism.

An apparatus for preparing hot beverages may operate in at least two, normally successive modes reflecting its primary functions: a brewing mode, and a keep-warm mode. In the former the apparatus executes a brewing cycle in which it brews the beverage, in the latter it keeps the brewed beverage warm for consumption, usually in a thermally non-insulated jug, cup or other vessel placed on a heated keep-warm plate. An auto-power-down mechanism for the apparatus may serve to limit the duration of the keep-warm mode, and to switch the apparatus off, either completely or into a stand-by mode, after a certain delay time that follows the end of a brewing cycle, so as to lower the apparatus' energy consumption. A delay time striking a balance between user comfort and energy efficiency may be on the order of tens of minutes.

In particular in relatively inexpensive machines, such as domestic drip filter coffee machines, it is desirable for an auto-power-down mechanism to be economically implementable.

SUMMARY OF THE INVENTION

It is an object of the present invention to provide for an apparatus for preparing hot beverages fitted with an auto-power-down mechanism that is economically implementable.

It is another object of the present invention to provide for an apparatus for preparing hot beverages fitted with an auto-power down mechanism that is capable of timing periods on the order of tens of minutes, e.g. 30-60 minutes.

The apparatus may include an electric heater. The apparatus may further include a latent heat storage provision that is arranged in operable thermal contact with the heater, and that contains, or is configured to contain, a phase-change material. The apparatus may also include an electric circuit for powering the electric heater. The electric circuit may, in addition to the electric heater, include a switch assembly that is configured to cut power to the heater when a temperature of the latent heat storage provision fulfills a predetermined auto-power-down condition.

To keep the apparatus according to the present invention economically manufacturable, its auto-power-down functionality does not rely on high-end solutions involving complex electronics such as microprocessor IC's, electronic timers, and the like. Instead, it may employ a combination of a latent heat storage provision (LHSP) and a preferably electromechanical switch assembly. This combination may cooperate with a heater of the apparatus, which heater may serve the keep-warm mode of the apparatus, and typically also its brewing mode.

At least during operation of the apparatus, the LHSP represents a thermal mass that may be regarded to possess 'inertia' in the sense that it resists temperature changes. Due to this thermal inertia, the LHSP may be used as a non-electronic timer. Within the apparatus, the LHSP may be arranged in operable thermal contact, e.g. conductive or radiative thermal contact, with the heater. Given a certain limited keep-warm power of the heater (i.e. electric power dissipated by the heater during the keep-warm mode), it may take a certain adjustable amount of time, the delay time, for thermal interaction between the heater, the LHSP, and the environment to have a temperature of the LHSP fulfill a predetermined auto-power-down condition. This auto-power-down condition may typically entail exceeding or falling below a certain temperature value. The delay time may be set, in particular factory set, by configuring one or more of the keep-warm power of the heater, the thermal conductance of the thermal contact between the heater and the LHSP, and the effective or average heat capacity of the LHSP, thereby taking account of any thermal losses that may be involved in heat exchange with the environment. The switch assembly may typically include a mechanical thermostat configured to continuously monitor the temperature of the LHSP, and to shut off the heater when it fulfills the predetermined auto-power-down condition, in particular by cutting the supply of electrical power to it.

The term LHSP as used in this text may be construed to refer to a feature of the apparatus that employs a phase-change material to exchange heat (so called 'latent heat') with its environment without changing temperature. A 'phase-change material' (PCM), in turn, may be construed to refer to a material or substance that, in the circumstances under which it is contained by the LHSP, changes its phase (e.g. between solid and liquid, or between liquid and gas) during normal operation of the apparatus, in particular due to an exchange of heat between the environment of PCM and the PCM.

The use of an LHSP is not only economical; it is also practical, and enables the accurate timing of delay times that are long in comparison to the timescales of heat transferring processes. These advantages hold in particular true relative to thermal inertia timers based on a non-PCM, e.g. a thermal inertia timer that uses a block of a certain solid material, such as a metal, as a thermal mass.

Timing a delay time on the order of tens of minutes, the lapse the delay time being marked by the thermal mass of the timer reaching a certain temperature, practically requires that the thermal mass has a fairly large heat capacity. For a non-PCM, this requirement of a large heat capacity necessitates the use of a large amount of the inertial substance in question. And using a large amount of that substance, of course, means a heavier, more voluminous apparatus with higher manufacturing and handling costs. Moreover, the temperature of a thermal mass of a non-PCM based timer changes with time throughout the entire timing process, and the rate at which the temperature changes is necessarily small. The preferably mechanical thermostat used to achieve a cost benefit in manufacturing the apparatus, however, typically has a large inaccuracy in its switching temperature, e.g. ±15° C. Because of the slowly changing temperature of the thermal mass, the inaccuracy of in the thermostat's switching temperature translates into an inaccurately timed delay time.

The presently proposed PCM-based timer solves these problems. It meets the above-mentioned requirement of an effectively large heat capacity by using the capability of a PCM to store a relatively large amount of heat per unit of volume (which reduces the need for a relatively large amount of substance). While timing the delay time, heat may be absorbed or given off by the LHSP at a constant temperature. Only when the phase change for all of the PCM has been completed will the temperature of the LHSP change; and it will do so relatively rapidly because the LHSP then behaving as an ordinary sensible heat storage provision contains only a relatively small amount of PCM. Accordingly, the temperature of the LHSP will quickly traverse the temperature range associated with the inaccurate switching temperature of the switch assembly, thus ensuring a more accurate timing of the delay time.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
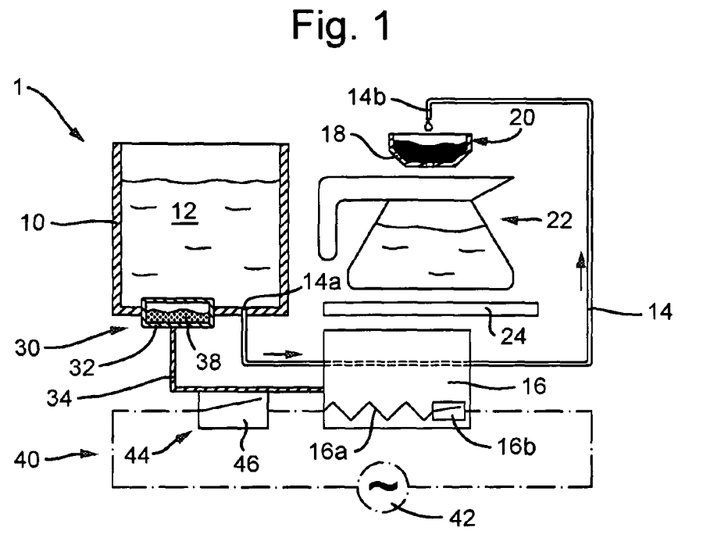
FIG. 1 schematically illustrates a drip filter coffee machine according to the present invention, featuring an LHSP in the form of a closed container containing a PCM, wherein the container is embedded in a bottom wall of a water tank of the machine.
Figure 2:
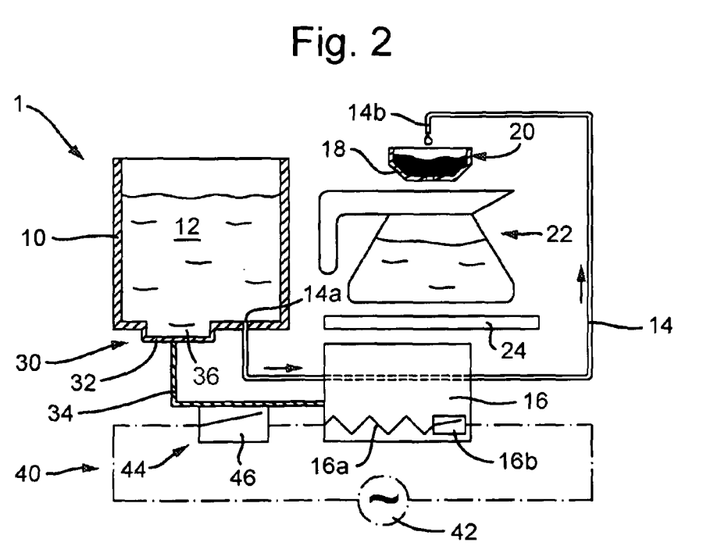
FIG. 2 schematically illustrates drip filter coffee machine according to the present invention, featuring an LHSP in the form of an open water pocket provided in a bottom wall of a water tank of the machine.
Figure 3:
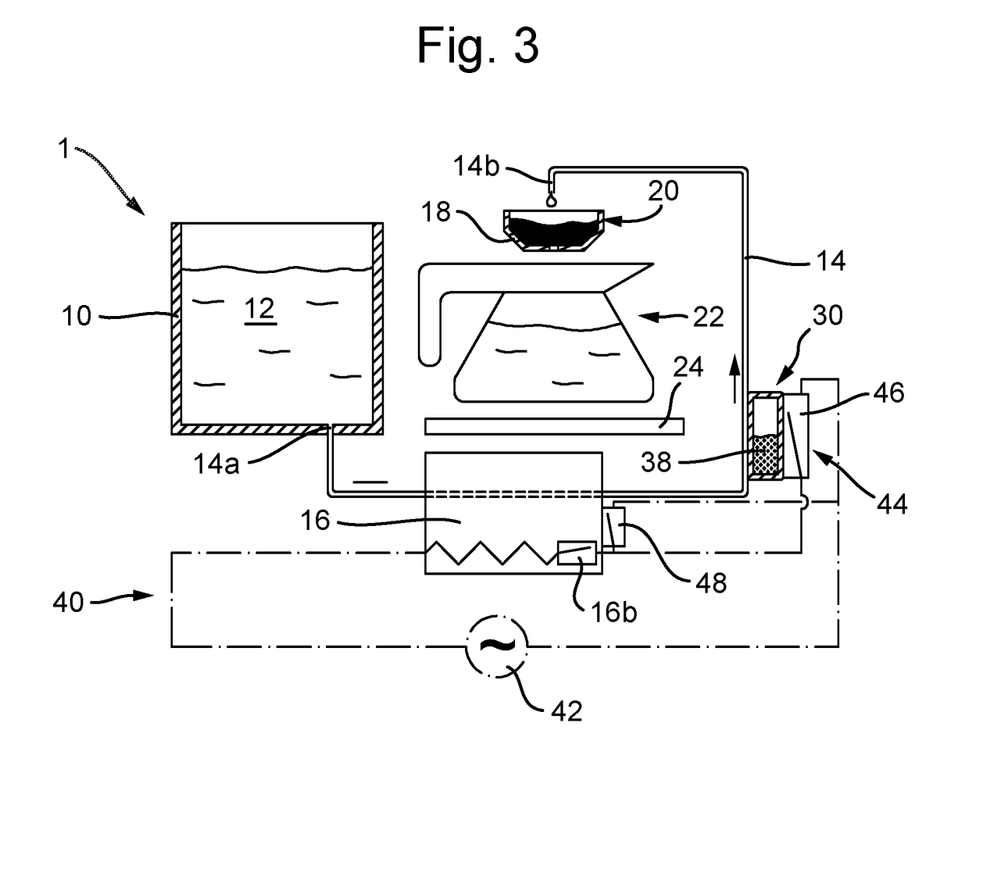
FIG. 3 schematically illustrates a drip filter coffee machine according to the present invention, featuring an electric circuit including two switches that are connected in parallel, and that together enable the timing of a delay time not through a delay in the heating of the LHSP, as in the embodiments of FIGS. 1-2, but through a delay in the cooling of LHSP.

FIGS. 1-3 schematically illustrate three different embodiments of an apparatus 1 according to the present invention. For ease of comparison and conciseness of the disclosure, all are in the form of an automatic, electric drip filter coffee machine. It is stressed, however, that the present invention is not limited to such coffee machines. Other embodiments of the apparatus according to the present invention may concern different kinds of coffee makers, for instance (manual) espresso machines, or machines for preparing hot beverages other than coffee, such as tea or chocolate milk. The coffee machines of FIGS. 1-3 differ in their respective auto-power-down mechanisms, as will be clarified below. First, however, the common construction and general operation of the depicted apparatus/coffee machines 1 are described briefly.

The presently disclosed apparatus 1 may include a stationary base and a removable jug or vessel 22. The base, which is not depicted as such, may in itself be of a conventional design, and include a water tank or water reservoir 10 that is (re)fillable with water 12, for instance via its open top side. The base may also include at least one electric heater 16, which may be incorporated in an electric circuit 40 that is configured to power it off an external power source 42, typically the mains. The heater 16 may include a heating element 16a of any suitable kind, e.g. an electrically resistive heater, and a preferably mechanical thermostat 16b that is physically disposed in thermal contact with the heating element 16a and electrically connected in series therewith. The thermostat 16b may have a switching temperature well above the boiling point of water, for instance in the range 120-160° C., and be configured to switch to an open state (locally breaking the electric circuit 40 in which it is incorporated) when its temperature exceeds its switching temperature, and, conversely, to switch to a closed state (locally closing the electric circuit 40) when its temperature falls below its switching temperature. The heater may 16 be arranged in thermal contact (e.g. radiative, conductive, or convective thermal contact) with a keep-warm plate 24 of the base, on which the jug 22 may be positioned during operation. In the depicted embodiments, the apparatus 1 includes only one heater 16 that serves both a brewing-mode and a keep-warm mode of the apparatus. In other, less economical embodiments, however, the apparatus 1 may comprise multiple heaters 16, for instance one to heat water during the brewing-mode, and another to heat the keep-warm plate 24 during the brewing mode and/or the keep-warm mode. A water conduit 14 may extend from an inlet 14a disposed in the water tank 10, along or through the heater 16, towards an outlet 14b, such as a shower head-shaped like nozzle. The outlet 14b may be arranged above a filter basket 18 that is attached to the base and arranged above the keep-warm plate 24. The filter basket 18 may hold ground coffee 20, for instance in a permanent disposable paper filter or a permanent wire mesh filter.

Once an apparatus 1 is set up for use and activated, the heater 16 may heat water in the water conduit 14 to its boiling point. In a bubble pump fashion, steam and hot water may then rise through the water conduit 14, and subsequently be distributed over the ground coffee 20 in the filter basket 18 at outlet 14b. As the water flows through the ground coffee 20, it is infused with coffee, until, eventually, it falls into the jug 22. As long as fresh water 12 can be drawn from the water tank 10, the apparatus 1 may continue this course of operation, which corresponds to its brewing-mode. At some point in time, however, the supply of water 12 in the water tank 10 will be depleted, such that no more water can be drawn therefrom to cool the heater 16. The heater 16, which until that point in time may have had a temperature only slightly above the boiling point of water, may therefore be less able to give off the heat it generates and rise in temperature. When the temperature of the heater 16 exceeds the switching temperature of its built-in thermostat 16b, the latter will switch to its open state and so cut the supply of power to the heating element 16a. The heater 16 is then allowed to cool off, in particular by dissipating heat to the jug 22 on the keep-warm plate 24, until its temperature again falls below the switching temperature of the built-in thermostat 16b. When this happens, the thermostat 16b will switch back to its closed state and so enable the reheating of the heater 16, until the heater again exceeds the switching temperature of the thermostat 16a, and so on. The repetitious cycle of thermostatically switching the heater 16 on and off corresponds to the keep-warm mode of the apparatus 1. The configuration of the apparatus 1 may preferably be such that a jug 22 of brewed coffee placed on the keep-warm plate 24 during the keep-warm mode is maintained at a temperature in the range of about 80-95° C.

Now that the common construction and general operation of the exemplary drip filter coffee machines of FIGS. 1-3 have been clarified, attention is invited to the auto-power-down mechanism according to the present disclosure, which serves to terminate the keep-warm mode after a desired, predetermined delay time from its start. The construction of the mechanism will be described first, in general terms and where applicable with reference to FIGS. 1-3. Next, its operation will be elucidated.

In general, embodiments of the presently disclosed auto-power-down mechanism may include a latent heat storage provision (LHSP) 30. In this text, the term 'latent heat storage provision' (LHSP) may be construed to refer to a feature of the apparatus that employs a phase-change material to exchange heat (so called 'latent heat') with its environment without changing temperature. An LHSP may be able to both absorb/store and give off latent heat. The term 'phase-change material' (PCM) may be construed to refer to a substance that, in the circumstances under which it is contained by the LHSP, changes its phase (e.g. between solid and liquid, or between liquid and gas) during normal operation of the apparatus, in particular due to a change in temperature. The PCM, and the conditions under which the PCM is contained by the LHSP, may preferably be selected to ensure that the PCM undergoes a phase transition at a temperature in the range of about 60-160° C. The lower end of this temperature range may ensure that the phase transition does not normally occur without heating action of the heater 16 (e.g. when the apparatus is off); the upper end may correspond to a typical safe maximum temperature of a heater 16 used in an apparatus for preparing hot beverages.

In one embodiment, such as the embodiments of FIGS. 1 and 3, the LHSP 30 may include a closed, i.e. fluidtightly sealed, container 32, which may hold a certain amount of PCM 38. The container 32 itself may preferably be made of a properly heat conducting material, i.e. a material having a thermal conductivity ≥10 W/mK, such as a metal or metal alloy. In combination with the closed container 32, a PCM set up for a liquid-gas phase change may be impractical, in particular due to the large volumes and high pressures that are generally required to contain gaseous materials. Accordingly, the PCM 38 may preferably be set up for a solid-liquid phase change, and thus be stored inside the container 32 under such conditions that it has a melting point in the aforementioned temperature range. The PCM 38 may in principle be any suitable organic or inorganic PCM, and for instance include a salt, such as a nitrate salt, which may typically have an operating temperature range of 120-260° C. For operating temperature ranges below 100° C., paraffin based or salt hydrate PCMs may be employed.

In one embodiment, the closed PCM container 32 of the LHSP 30 may be arranged for good, preferably conductive thermal contact with the water tank 10 and its contents. In one embodiment, for instance, the container 32 may be connected e.g. by welding or gluing with a thermal gel to an outer surface of a bounding wall of the water tank 10; in this case, the wall of the water tank 10 may preferably be made of a properly heating conducting material as well. In another embodiment, such as that depicted in FIG. 1, the container 32 may be embedded in a wall of the water tank 10, preferably such that it itself partially bounds the interior volume of the water tank 10 and it is in direct thermal contact with the contents of the tank. In embodiments wherein the container 32 is connected to or embedded in a bounding wall of the water tank 10, said wall may preferably be a bottom wall, so as to ensure thermal contact between the container 32 and a body of water 12 in the water tank 10 up to the point that the tank 10 is completely drained. In yet another embodiment, the container 32 may be disposed completely within the water tank 10, e.g. adjacent to the bottom wall, such that it is immersed in water when the water tank is filled for use. In the latter two embodiments, the container 32 may be provided with heat exchange enhancing features, such as heat fins, that extend into the interior volume of the water tank 10.

In another embodiment, such as the embodiment of FIG. 2, the LHSP 30 may include an open instead of a closed container. The open container may in particular take the form of a water pocket 36 defined by a wall of the water tank 10. The (interior volume of the) water pocket 36 may be in fluid communication with the (interior volume of the) water tank 10, and be arranged such that it is filled with water when the water tank is filled with water, while it is not emptied by the extraction of water from the water tank during the preparation of a hot beverage. As in the embodiment of FIG. 2, for example, the water pocket 36 may be formed by a recess in a bottom wall of the water tank 10, while the inlet 14a of the water conduit 14 may be arranged such that it cannot drain water from the water pocket 36. In an alternative embodiment, the water pocket 36 could be formed as a blind, downward sloping hole in a side wall of the water tank 10. It is understood that in an embodiment featuring an LHSP 30 in the form of an open water pocket 36, the PCM 38 may be water, which, under normal atmospheric operating conditions, undergoes a liquid-gas phase transition at about 100° C. Embodiments employing a water pocket 36 may thus do without a closed container 32 containing a specially selected PCM 38, which makes them more economical to manufacture.

The LHSP 30 specifically the closed container 32 in the embodiments of FIGS. 1 and 3, and the water pocket 36 in the embodiment of FIG. 2 may be arranged in operable thermal contact with the heater 16. That is, the LHSP 30 may arranged such that, during operation of the apparatus 1, heat may be transferred to the LHSP 30, possibly with the aid of water that is being moved through water conduit 14.

To enable adjustment of the heat transfer rate from the heater 16 to the LHSP 30, the primary thermal contact between the heater and the LHSP may be provided for by a heat transfer link 34, i.e. a passive heat conducting body, that interconnects the heater 16 and the LHSP to provide for thermal contact between them. In one embodiment, such as the embodiments of FIGS. 1-2, the heat transfer link 34 may be solid, and have an elongate, e.g. bar-like, shape having a first end that is connected to the heater 16 and a second end that is connected to the LHSP 30. Through its elongate, straight or bent shape the heat transfer link 34 may effectively space the heater 16 and the container 32 apart, so as to increase the significance of conductive heat transfer between them relative to alternative modes of heat transfer, such as radiative and convective heat transfer. The (absolute) thermal conductance [W/K] of the heat transfer link 34 may be determined by selecting the material of the link (which determines its material-specific thermal conductivity [W/mK]) and its physical dimensions.

In another embodiment, such as the embodiment of FIG. 3, thermal contact between the heater 16 and the LHSP 30 may be provided for by a water conduit 14. In this case, the primary mode of heat transfer may be convection: the flow of hot water that runs through the water conduit 14 during the brewing-mode of the apparatus 1 may transfer heat from the heater 16 to the LHSP 30, which may be connected to the water conduit 14 at a position downstream of the heater 16. The relevance of conductive heat transfer between the heater 16 and the LHSP 30 via the hollow water conduit 14 itself may be relatively small. Accordingly, the rate of heat transfer from the heater 16 to the LHSP 30 may be relatively great when the apparatus 1 operates in the brewing-mode, and relatively small when the apparatus operates in the keep-warm mode.

In addition to the LHSP 30, the auto-power-down mechanism may include the aforementioned electric circuit 40. This electric circuit 40 may include the heater 16, which it may be configured to power. In addition, the electric circuit may include a switch assembly 44.

The switch assembly 44 may include at least a first switch 46, that, within the electric circuit 40, may be connected in series with the heater 16. The first switch 46 may preferably include a mechanical thermostat, e.g. an in itself conventional, analogue bimetallic strip- or coil-based thermostat, that is configured to alternatively locally close and open/break the electric circuit 40, so as to respectively enable and disable the supply of power to the heater 16.

The first switch 46 may be arranged in thermal contact with the LHSP 30 to ensure that a temperature of the first switch 46 is directly related to a temperature of the LHSP 30. Although the thermal contact may be at least partially radiative and/or convective in nature, it may preferably be primarily conductive. To provide for such primarily conductive thermal contact, the first switch 46 may be connected to the LHSP 30, either directly, e.g. by fixing one against the other (see FIG. 3), or indirectly, e.g. by connecting the first switch 46 to the heat transfer link 34 link (see FIGS. 1 and 2).

The condition under which the first switch 46 locally closes and opens the electric circuit 40 may differ for different embodiments. In one embodiment, such as the embodiments of FIGS. 1 and 2, the first switch 46 may switch from a closed state into an open state when its temperature exceeds a predetermined switch temperature; this switch temperature may be chosen somewhat higher than the temperature at which the phase change of the PCM 38 of the associated LHSP 30 occurs. In another embodiment, such as the embodiment of FIG. 3, the first switch 46 may switch from a closed state into an open state when its temperature falls below a predetermined switch temperature; here the switch temperature may be somewhat lower than the temperature at which the phase change of the PCM 38 of the LHSP 30 thermally connected to the first switch 46 occurs. In either case, the difference between the chosen switching temperature and the temperature at which the phase change of the PCM 38 occurs may preferably be greater than the inaccuracy in the switching temperature. For instance, when the first switch 46 is to switch to an open state when its temperature becomes too high, while the switching temperature of the first switch has an inaccuracy of ±15° C. and the temperature of the phase transition of the PCM 38 is T, the switching temperature of the first switch 46 may preferably be chosen greater than T+15° C., such that is reliably triggered only after completion of the phase change of the PCM 38.

As in the embodiments of FIGS. 1-2, the first switch 46 may be configured such that its transition from the closed state to the open state depends on its temperature, while its transition from the open state to the closed state requires a manual reset. To enable a manual reset of the first switch 46, the first switch 46 may be mechanically linked to or include a preferably mechanical on/off button that is arranged externally on the apparatus 1, and that is configured such that turning the apparatus 1 on by means of the button resets the first switch 46 to its closed state.

In one embodiment, such as the embodiment of FIG. 3, the switch assembly 44 may further include a second switch 48, which, like the first switch 46, may include a mechanical thermostat. The second switch 48 may serve to monitor a temperature of the heater 16, and be arranged in good thermal contact therewith; the second switch 48 may, for instance, be attached to the heater 16 or be disposed adjacent thereto. Within the electric circuit 40, the second switch 48 may be connected in series with the heater 16, and in parallel with the first switch 46. Furthermore, the second switch 48, may be configured to switch from a closed state into an open state when its temperature exceeds a predetermined switch temperature, while its transition from the open state to the closed state may require a manual reset, for instance through an on/off button as described above. The switching temperature of the second switch 48 may typically be in between a maximum temperature that is reached by the heater 16 when the apparatus 1 operates in its brewing mode and the switching temperature of the built-in thermostat 16b of the heater 16.

Figure 4:
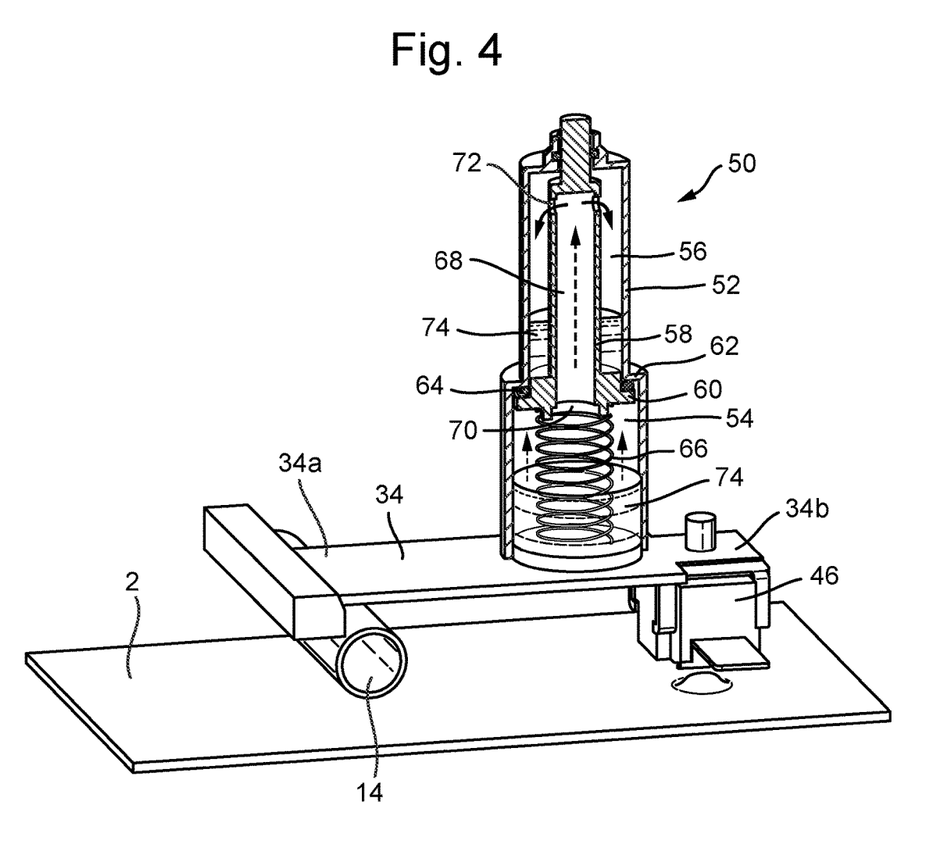
FIG. 4 schematically illustrates, partly in cross sectional view, an example of an fourth embodiment in which the LHSP is embodied as a heat pipe.

FIG. 4 shows an example of latent heat storage provision (LHSP) that is embodied as a heat pipe 50. The embodiment includes a heat transfer link 34 in the form of a heat conductive strip, for example, manufactured from metal. A first end 34a of the heat transfer link 34 may be in heat conductive contact with the water conduit 14 of which just a small part is shown in FIG. 4. This heat conductive contact may be formed by a direct connection or by an indirect connection via heat conductive material. Adjacent a second end 34b of the heat transfer link 34 a first switch 46 embodied as thermostat, e.g. a mechanical thermostat, may be connected with the heat transfer link 34. The first switch 46 has a switching temperature. Above the switching temperature, the first switch 46 is in the open position and below the switching temperature, the first switch may be reset in the closed position. To that end, the first switch 46 may have a reset button to reset the first switch 46 from the open position in which the electric circuit 40 is broken to the closed position in which the electric circuit 40 closed. Alternatively, the resetting may be automatic. Between the first end 34a and the second end 34b of the heat transfer link 34, the heat pipe 50 is connected with the heat transfer link 34. The heat pipe 50 includes a heat pipe housing 52 that bounds a lower chamber that forms an evaporator chamber 54 and that is in heat conductive contact with the heat transfer link 34. The heat pipe housing 52 also bounds an upper chamber that forms a condenser chamber 56. A plunger 58 is movably arranged in the heat pipe housing 52. The plunger 58 can be in a closed position in which no liquid can pass from condenser chamber 56 to the evaporator chamber 54. To that end, an embodiment of the plunger 58 of which an example is shown in FIG. 4 may include a plunger flange 60 that co-operates with a housing flange 62 of the heat pipe housing 52. Optionally one of the flanges 60, 62 may be provided with a sealing ring 64 so that a liquid tight seal may be obtained when the plunger 58 is moved to the closed position and the flanges 60, 62 are abutting with interposition of the sealing ring 64. In the example of the embodiment shown in FIG. 4 the plunger 58 is biased in this closed position by a spring 66. A part of the plunger 58 may extend outside of the heat pipe housing 52 in order to be able to push the plunger 58 out of the closed position into an open position. In an embodiment, the reset button of the first switch 46 may be positioned such that when the plunger 58 is pushed to the open position, the reset button is actuated simultaneously. In the example shown in FIG. 4, the reset button of the first switch 46 is at a lower side of the first switch 46 and may be actuated by pushing the first switch 46 downwardly against a frame or housing part 2 of the apparatus 1. In the example shown in FIG. 4, this pushing down can be effected by pushing on the outwardly extending part of the plunger 58, thereby bending the heat transfer link 34 so that the reset button of the first switch 46 may contact the frame or housing part 2 of the apparatus 1. As a consequence, with one action of the user both the first switch 46 is reset into the closed position and the liquid 74 present in the condenser chamber 56 may flow to the evaporator chamber 54. The heat pipe 50, preferably the plunger 58 thereof, may include a gas channel 68 having at least one first opening 70 that opens into the evaporator chamber 54 and having at least one second opening 72 that opens into the condenser chamber 56. The heat pipe housing 52 is partly filled with a liquid 74 that acts as the latent heat storage provision (LHSP). The amount of liquid is preferably chosen such that all the liquid may be in the evaporator chamber 54 or, alternatively in the condenser chamber 56. The operation of this embodiment will be described later.

Figure 5:
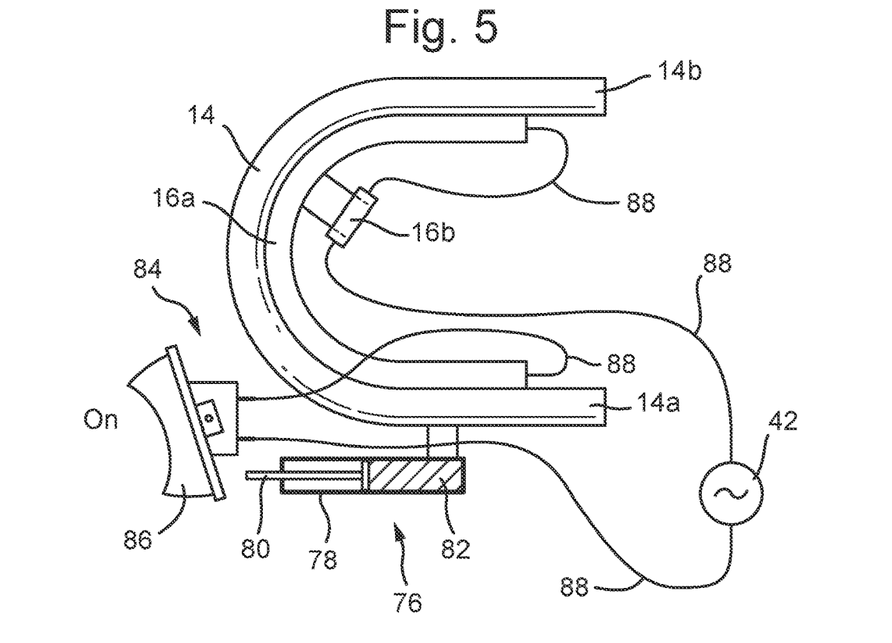
FIG. 5 schematically illustrates an example of a fifth embodiment in which the LHSP is embodied as a thermal wax actuator, wherein the thermal wax actuator and the co-operating on/off-switch are in a first position.
Figure 6:
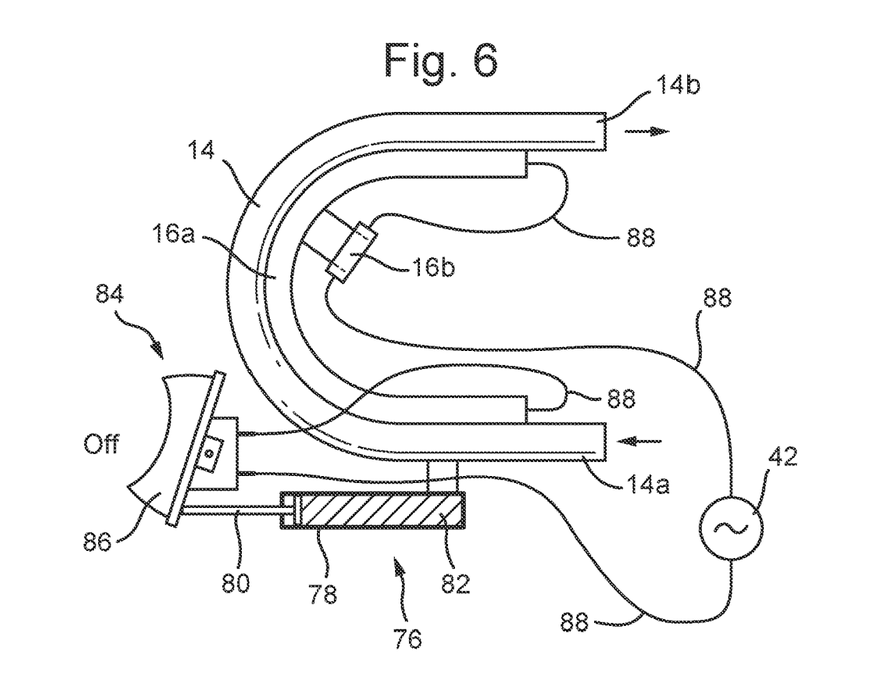
FIG. 6 is a similar view as FIG. 5 with the thermal wax actuator and the co-operating on/off switch are in a second position.

FIGS. 5 and 6 show an example of an embodiment in which the latent heat storage provision (LHSP) is a thermal wax actuator 76. Thermal wax actuators are known per se and for example sold by Caltherm Inc. from the USA, Vernet S. A. from France and BEHR Thermot-tronik GmbH from Germany. A thermal wax actuator 76 includes a thermal wax actuator housing 78 in which a piston 80 is moveably arranged. The piston 80 may extend outside of the thermal wax actuator housing 78. The degree of extension of the piston 80 varies. The piston 80 may move from a withdrawn position to an extended position. The thermal wax actuator housing 78 also contains a wax material 82 that may be in a solid phase or in a liquid phase. The phase of the wax 82 depends on the temperature of the wax 82. When the wax 82 changes from the solid phase to the liquid phase it expands. Due to the expansion of the wax 82, the piston 80 will move to the extended position in which the piston 80 extends more outside of the thermal wax actuator housing 78 than when the wax 82 is in the solid state. When the wax 82 is in the solid phase, the piston 80 will move or may be moved in the withdrawn position. It should be noted that the term "withdrawn position" is not limited to a situation in which the piston 80 is completely withdrawn in the thermal wax actuator housing 78 but also to a situation in which the piston 80 is partly withdrawn in the thermal wax actuator housing 78. In an embodiment, the wax 82 and the piston 80 may be separated from each other by a diaphragm (not shown) that is included in the thermal wax actuator housing 78. Alternatively, the piston 80 may be surrounded by an elastomer bag (not shown). When heated, the wax 82, enclosed in the thermal wax actuator housing 78 expands and applies pressure, optionally via the diaphragm or via the bag, on the piston so that at least an axial force is exerted on the piston 80. This axial force pushes the piston 80 to the extended position. In an embodiment, a spring (not shown) may be provided to ensure that the piston returns to its withdrawn position when the wax material 82 solidifies. However, an embodiment without a spring is also feasible. The thermal wax actuator housing 78 of the thermal wax actuator 76 is made of a material that has a high heat conductivity, for example copper, brass, aluminum or the like.

In the embodiment with the thermal wax actuator 76, of which an example is shown in FIGS. 5 and 6, the thermal wax actuator 76 is connected with a water conduit 14 of the apparatus 1. The connection between the thermal wax actuator 76 and the water conduit 14 is heat conductive. The water conduit 14 has an inlet 14a and an outlet 14b. The apparatus includes a heater 16 comprising a heating element 16a that is in heat conductive contact with the water conduit 14. The heating element 16a may be electrical resistance heater. The heater 16 may include mechanical thermostat 16b that is physically disposed in thermal contact with the heating element 16a and electrically connected in series therewith. The thermostat 16b may have a switching temperature well above the boiling point of water, for instance in the range 120-160° C., and be configured to switch to an open state (locally breaking the electric circuit 40 in which it is incorporated) when its temperature exceeds its switching temperature, and, conversely, to switch to a closed state (locally closing the electric circuit 40) when its temperature falls below its switching temperature. Additionally, the apparatus 1 may include a power switch 84 having an on/off button 86. The thermal wax actuator 76 is positioned relative to the power switch 84 so that the piston 80 engages the power switch 84 to push the power switch 84 in an off-position when the piston 80 is in the extended position and so that the power switch 84 is able to be brought into the on-position when the piston 80 is in the withdrawn position. When the wax solidifies, the piston 80 may automatically move to the withdrawn position, for example by means of a spring, or may be moved to the withdrawn position by pushing on the on/off button 86 of the power switch 84 to bring the power switch 84 again in the on-position. In an embodiment, the power switch 84 may be a rocker switch. Preferably, the composition and the amount of the wax 82 are configured such that the apparatus switches off after a predetermined time that is in the range of 30-60 minutes, for example, approximately 40 minutes. The apparatus includes an electrical circuit 40 including a power source 42, and wiring 88 that connects in series, at least the heating element 16a and the power switch 84 and optionally also the thermostat 16b to the power source 42.

Now that various embodiments of the auto-power-down mechanism according to the present invention have been described, partly in relation to the automatic drip filter coffee machines of FIGS. 1-3, the operation of the depicted auto-power-down mechanisms comprised by the depicted coffee machines will be discussed in turn.

Referring first to the coffee machine 1 of FIG. 1. Let us assume that a user has set up the apparatus 1 by filling the water tank 10 with cold water, putting ground coffee 20 in the filter basket 18, and connecting the electric circuit 40 to the mains 42. The coffee machine 1 will then first operate in its brewing mode, and prepare hot coffee as described above in a first brewing cycle. During this brewing cycle, part of the heat generated by the heater 16 will flow from the hot heater 16, through the heat transfer link 34, towards the LHSP 30. As the LHSP 30 is arranged in good thermal contact with the water tank 10, the heat so transferred to the LHSP 30 is quickly dissipated into the cold water. And since water has a relatively large specific heat, neither the LHSP 30 nor the water in the tank will heat up dramatically.

Due to the fact that the LHSP 30 is embedded in the bottom wall of the water tank 10, the thermal status quo is maintained until the water tank 10 is completely drained. The moment the water tank 10 runs dry marks the end of the brewing mode, and the beginning of the keep-warm mode. It also marks the beginning of the delay time, i.e. the time interval after which the coffee machine 1 must automatically shut off. Heat generated by the heater 16 is now no longer used to boil water in the water conduit 14 to brew coffee. Instead, part of the generated heat is transferred, e.g. radiated, to the keep-warm plate 24, while another part is still transferred to the LHSP 30 via the heat transfer link 34. The LHSP 30, however, can no longer give off the heat it receives to a body of water. Consequently, it will start to absorb the heat. Initially, the LHSP 30 may act as a sensible heat storage device, and its temperature may increase as it absorbs the heat transferred to it. However, when the temperature of the LHSP 30 reaches the melting point of the PCM 38, the steady rise in temperature comes to a halt. The LHSP 30 will absorb heat at a nearly constant temperature until all PCM 38 is transformed into the liquid phase. It is understood that the times it takes for the phase change to be completed may largely correspond to the delay time, and be configured by selecting, inter alia, the material used as the PCM 38, the amount of PCM 38 in the container 32, the material and dimensional characteristics of the heat transfer link 34, and the net power dissipated by the heater 16 in the keep-warm mode. Once the phase change is completed, and all PCM 38 has transformed into the liquid phase, the temperature of the LHSP 30 will continue to rise further. After a time interval approximately equal to the delay time, the temperature of the LHSP 30 will reach the switching temperature of the first switch 46 that is thermally connected to it. The first switch 46 will then switch from its closed state to its open state, thereby locally breaking the electric circuit 40, cutting the supply of power to the heater 16, and effectively shutting the coffee machine 1 off.

To initiate a second brewing cycle, the LHSP 30 must be reset; i.e., the now liquid PCM 38 must be solidified again. Of course, the LHSP 30 would naturally cool to room temperature if the apparatus 1 would be left to itself; this could, however, take a while. Placement of the LHSP 30 in thermal contact with the water tank 10 overcomes this issue as it naturally ensures rapid re-solidification of the PCM 38 when the user prepares for a next brewing cycle by pouring fresh cold water in the water tank 10. Once the water tank 10 is refilled, the PCM 38 has cooled and solidified again due to the contact with the fresh cold water, such that only the first switch 46 needs to be manually reset into its closed state via the on/off switch of the coffee machine 1 to start another brewing cycle.

The operation of the embodiment of FIG. 2 is generally similar to that of FIG. 1. The embodiment of FIG. 2 mainly differs from that of FIG. 1 in that the LHSP 30 includes an open water pocket 36, and in that the PCM 38 used with the LHSP is water. Accordingly, a liquid-gas phase change of the PCM occurs at about 100° C., and the switching temperature of the first switch 46 may chose be around, e.g. somewhat above, the boiling point of water, (of course depending on, inter alia, the thermal conductance of the heat transfer link 34).

Unlike the embodiments of FIGS. 1 and 2, the operation of the embodiment of FIG. 3 does not time the delay time through a delay in the heating of LHSP 30. Instead, it times the delay time through a delay in the cooling of the LHSP 30. To this end, the electric circuit 40 of the coffee machine 1 of FIG. 3 includes two switches 46, 48 in parallel. The first switch 46 monitors the temperature of the LHSP 30, and is configured to locally break the electric circuit 40 when its temperature falls somewhat below the temperature at which the PCM 38 in the LHSP 30 changes phase, e.g. about 70° C. The second switch 48 monitors a temperature of the heating element 16. It has a switching temperature in between a maximum temperature that is reached by the heater 16 when the apparatus 1 operates in its brewing mode (e.g. 105° C.) and the switching temperature of the built-in thermostat 16b of the heater 16 (e.g. 140° C.), e.g. about 120° C. The second switch 48 is configured to locally open/break the electric circuit 40 when its temperature exceeds its switching temperature. Only the second switch 48 requires a manual reset to its closed condition.

Now, when a user has set up the apparatus 1 for use, he may initiate a first brewing cycle by pressing its on/off button so as to turn the apparatus on. Pressing the on/off button manually resets the second switch 48 to its closed state, and thus enables the supply of electric current to the heater 16. The heater 16 may rapidly heat up and start boiling water in the water conduit 14. The resulting downstream fluid flow of water and steam through the water conduit 14 may subsequently heat up the LHSP 30. As the flow of hot water continues, the first switch 46 connected to the LHSP 30 is gradually heated to above its switching temperature, which causes it to switch into its closed state. Next, the PCM 38 of the LHSP 30 will be heated to above the temperature of its phase change, which will cause it to melt. The temperature of neither the second switch 48 nor the LHSP 30 will rise much above 100° C., however, as long as fresh cold water can be drawn from the water tank 10 to 'cool' the heater 16. Once the water tank 10 runs dry, the heater 16 can no longer give off its heat to water; consequently, it will heat up, first triggering the second switch 48 to (permanently) switch into its open state, and then triggering the built-in thermostat 16b of the heater 16 to (temporarily) switch into its open state. This point in time marks the beginning of the keep-warm mode. During the keep-warm mode, the heater's built-in thermostat 16b may periodically switch between its open and closed states, and thus periodically allow power to be supplied to the heating element 16a via the first switch 46 (the second switch 48 is now permanently closed). Because there is no downstream flow of hot water through the water conduit 14 during the keep-warm mode, the LHSP 30 will slowly cool off. The LHSP 30 is arranged at a position along the water conduit 14 at which a keep-warm mode equilibrium temperature is below the switching temperature of the first switch 46. Accordingly, while the keep-warm plate 24 is kept at a suitable temperature, the LHSP 30 slowly gives off its heat to its environment, which allows the PCM 38 to solidify and the temperature of the LHSP 30 to fall below the switching temperature of the first switch 46. When that happens, after the predetermined delay time, the first switch 46 switches into its open state, completely breaking the electric circuit 40 and cutting power to the heater 16. A new, second brewing cycle may now simply be initiated by repeating the procedure.

The operation of the fourth embodiment, of which an example is shown in FIG. 4, is as follows. When heat is supplied to the heat transfer link 34, it will be dissipated by the heat pipe 50 because the liquid 74 in the evaporator chamber 54 will start to evaporate. The gas that is formed may flow through the plunger 58 to the condenser chamber 56 and remain there until the plunger 58 is pushed from the closed position into the open position by a user. As long as there is liquid 74 to be evaporated in the evaporator chamber 54, the second end 34b of the heat transfer link 34 will remain relatively cool. Consequently, the first switch 46 that is preferably embodied as a mechanical thermostat will remain in the closed position so that the heater 16 remains powered by the power source 42. When, after a certain time, all the liquid 72 in the evaporator chamber 54 has been evaporated, the temperature of the heat transfer link 34 will rise also at the second end 34b thereof. Consequently, the first switch 46 will switch to an opened position and the electric circuit 40 will be broken so that the heater 16 is switched off. The switching off can be postponed by pushing the plunger 58 out of the closed position into the opened position so that liquid from the condenser chamber 56 may flow again to the evaporator chamber 54. When the first switch 46 has switched to the opened position, it may be reset by the user by means of a reset button on the first switch 46. The reset button of the first switch 46 may be connected with an on/off-button of the apparatus 1 that may be manually actuated. Optionally, the same on/off-button may also actuate the plunger 58 so that any liquid in the condenser chamber 56 may flow to the evaporator chamber 54 when the on/off-button is actuated. In the example shown in the figures this is achieved by pushing on the outwardly extending part of the plunger 58 and simultaneously bending the heat transfer link 34 so that the reset button at the lower part of the first switch 46 is pushed against a frame or housing part 2 of the apparatus.

The embodiment with the heat pipe 50 may be manufactured relatively cheap. Because the heat pipe housing 52 is closed, the same amount of liquid 74 will always be present within the heat pipe housing 52 for evaporation. Consequently, the delay time that is obtained will be very constant and not dependent from external factor such as humidity. Additionally, the first switch can be a simple mechanical thermostat, for example a bi-metal, which renders the construction very cheap. The heat pipe 50 is of a simple construction and may be manufactured in a very cost effective manner.

The operation of the fifth embodiment, of which an example is shown in FIGS. 5 and 6 is as follows. When the water in the water conduit 14 is cold, the wax material 82 in the thermal wax actuator 76 will be in the solid phase and have a small volume. Consequently, the piston 80 may be, or may be brought into the withdrawn position as shown in FIG. 5. The power switch 84 may be activated by a user to bring it into the on-position as shown in FIG. 5. When the water stops flowing through the water conduit 14, the heating element 16a will cause a raise of temperature of the water conduit 14. Consequently, heat will be transferred to the thermal wax actuator 76 and the wax material 82 in the thermal wax actuator 76 will start to melt and expand. As a consequence of the expansion, the piston 80 will move from the withdrawn position to the extended position as shown in FIG. 6. With that movement, the piston 80 will engage the power switch 84 and push the power switch 84 in the off-position. Thus, the electric circuit 40 will be broken and the electrical heating element 16a will be disconnected from the power source 42. The water conduit 14 will lower in temperature again and the wax material 82 will solidify again and shrink. Consequently, the piston 80 will move back to the withdrawn position automatically, for example, by means of a spring, or may be moved back to the withdrawn position by actuating the on/off button 86 of the power switch 84.

The thermal wax actuators 76 are manufactured in large numbers and are relatively cheap while simultaneously being very durable. The proposed construction is extremely simple and does not require any additional switch, not even a simple mechanical thermostat. In view thereof, an apparatus in accordance with the embodiment with the thermal wax actuator 76 can be manufactured at relatively low costs and still comply with the wish to have an automatic switch off after a predetermined time.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

The invention claimed is:

1. An apparatus for preparing hot beverages, comprising:
   a heater;
   a latent heat storage provision that is arranged in operable thermal contact with the heater, and that contains, or is configured to contain, a phase-change material;
   a water tank from which water is extractable for preparing the hot beverages; and
   an electric circuit configured to power the heater, the electric circuit comprising a switch assembly that is configured to cut power to the heater when a temperature of the latent heat storage provision fulfills a predetermined auto-power-down condition,
   wherein the latent heat storage provision directly contacts the water tank.

2. The apparatus according to a claim 1, wherein the auto-power-down condition is fulfilled when the temperature of the latent heat storage provision falls below a predetermined temperature.

3. The apparatus according to claim 1, wherein the auto-power-down condition is fulfilled when the temperature of the latent heat storage provision exceeds a predetermined temperature.

4. The apparatus according to claim 1, wherein the latent heat storage provision includes a closed container containing said phase-change material.

5. The apparatus according to claim 1, wherein the phase-change material is a salt having a melting point in a range of 60-160° C.

6. An apparatus for preparing hot beverages, comprising:
   a heater;
   a latent heat storage provision that is arranged in operable thermal contact with the heater, and that contains, or is configured to contain, a phase-change material; and
   an electric circuit for powering the heater, the circuit comprising a switch assembly that is configured to cut power to the heater when a temperature of the latent heat storage provision fulfills a predetermined auto-power-down condition, wherein the latent heat storage provision includes a water pocket, said water pocket being in fluid communication with a water tank from which water is extractable for preparing beverages, and arranged such that it is filled with water when the water tank is filled with water while it is not emptied by extraction of water from the water tank for preparing the hot beverages.

7. The apparatus according to claim 6, wherein the water pocket is provided in a bottom wall of the water tank.

8. The apparatus according to claim 1, wherein a heat transfer link includes a metal and interconnects the heater and the latent heat storage provision to provide for a thermally conductive contact between them.

9. The apparatus according to claim 1, wherein the switch assembly includes a first switch that is incorporated in the electric circuit, in series with the heater, the first switch being configured to locally break the electric circuit when the temperature of the latent heat storage provision fulfills the auto-power-down condition.

10. An apparatus for preparing hot beverages, comprising:
a heater;
a latent heat storage provision that is arranged in operable thermal contact with the heater, and that contains, or is configured to contain, a phase-change material; and
an electric circuit for powering the heater, the circuit comprising a switch assembly that is configured to cut power to the heater when a temperature of the latent heat storage provision fulfills a predetermined auto-power-down condition,
wherein the first switch is configured to locally break the electric circuit when the temperature of the latent heat storage provision falls below a first predetermined value; and
wherein the switch assembly includes a second switch that is incorporated in the electric circuit, in series with the heater and in parallel with the first switch, the second switch being configured to locally break the electric circuit when its temperature exceeds a second predetermined value.

11. The apparatus according to claim 10, wherein at least one of the first switch and the second switch includes a bimetallic strip-based thermostat.

12. The apparatus according to claim 10, wherein one of the first switch and the second switch requires a manual reset to locally close the electric circuit after a respective switch of the first switch and the second switch has locally broken the electric circuit due to a change in temperature.

13. An apparatus for preparing hot beverages, comprising:
a heater;
a latent heat storage provision that is arranged in operable thermal contact with the heater, and that contains, or is configured to contain, a phase-change material;
an electric circuit for powering the heater, the circuit comprising a switch assembly that is configured to cut power to the heater when a temperature of the latent heat storage provision fulfills a predetermined auto-power-down condition;
a water conduit that is in heat conductive contact with the heater;
a heat transfer link having a first end that is in heat conductive contact with the water conduit and having a second end;
a first switch which is a thermostat having a switching temperature and which is part of the switch assembly in the electric circuit and which is in heat conductive contact with the second end of the heat transfer link; and
a heat pipe serving as the latent heat storage provision and being connected with the heat transfer link at a position between the first end and the second end so as to be in heat conductive contact with the heat transfer link, the heat pipe including:
a heat pipe housing containing a liquid and enclosing an evaporator chamber and a condenser chamber;
a plunger that is moveably arranged in the heat pipe housing and that is biased in a closed position in which no liquid can pass from the condenser chamber to the evaporator chamber and that may be pushed to an open position so that liquid present in the condenser chamber may flow to the evaporator chamber;
a gas channel having at least one first opening that opens into the evaporator chamber and having at least one second opening that opens into the condenser chamber and via which gas that is formed by evaporation of the liquid in the evaporator chamber flows to the condenser chamber;
wherein, when liquid is present in the evaporator chamber, heat supplied by the water conduit to the heat transfer link is substantially absorbed in the heat pipe for evaporating the liquid so that the temperature of the heat transfer link at the second end thereof stays below switching temperature of the first switch, and
wherein, when all the liquid in the evaporator chamber has been evaporated, the heat transfer link raises in temperature also adjacent the second end thereof until the switching temperature of the first switch is reached, the first switch takes up an open position, and the electric circuit is broken.

14. The apparatus according to claim 13, wherein the gas channel extends in the plunger and wherein the at least one first opening and the at least one second opening are formed in the plunger.

15. The apparatus according to claim 13, wherein the heat pipe includes a spring to bias the plunger in the closed position.

16. The apparatus according to claim 15, wherein the plunger extends partly outside of the heat pipe housing so as to be engageable by a user to push the plunger from the closed position into the open position.

17. The apparatus according to claim 16, wherein the first switch includes a reset button to reset the first switch from the open position in which the electric circuit is broken to a closed position in which the electric circuit closed, wherein the reset button is positioned such that when the plunger is pushed to the open position, the reset button is actuated simultaneously.

18. The apparatus according to claim 1, including:
a water conduit that is in heat conductive contact with the heater;
a thermal wax actuator serving as the latent heat storage provision and being in heat conductive contact with the water conduit, the thermal wax actuator including:
a thermal wax actuator housing;
a piston that is moveably arranged in the thermal wax actuator housing and that may be in an extended position and a withdrawn position, wherein the piston extends to a greater extend outside of the thermal wax actuator housing when it is in the extended position than when it is in the withdrawn position;
wax material that is contained in the thermal wax actuator housing and that may be in a liquid phase in which it is expanded and in which the material pushes the piston in the extended position, wherein the wax material may be in a solid phase in which it is shrunk relative to the liquid phase so that the piston moves or is moveable to the withdrawn position;

a power switch being part of the switch assembly and having an on-position in which the heater is powered and having an off-position in which the heater is not powered;

wherein the thermal wax actuator is positioned relative to the power switch so that the piston engages the power switch to push the power switch in an off-position when the piston is in the extended position and so that the power switch is able to be brought into the on-position when the piston is in the withdrawn position.

19. The apparatus according to claim 18, wherein the composition and the amount of wax material are configured such that the apparatus switches off after a predetermined time that is in the range of 30-60 minutes.

20. The apparatus according to claim 18, wherein the power switch includes an on/off button that may be actuated by a user.

21. The apparatus according to claim 20, wherein the power switch is a rocker switch.

22. The apparatus according to claim 1, being a coffee machine.

* * * * *